United States Patent [19]

Hageman et al.

[11] 4,171,936
[45] Oct. 23, 1979

[54] ENGINE TURBOCHARGER WITH INTEGRAL WASTEGATE

[75] Inventors: John B. Hageman, Vandalia; Denny L. Peeples, Dayton; Michael Demido, Troy, all of Ohio

[73] Assignee: General Motors Corporation, Detroit, Mich.

[21] Appl. No.: 885,676

[22] Filed: Mar. 13, 1978

[51] Int. Cl.$^2$ ............................................ F02D 23/00
[52] U.S. Cl. ...................................... 417/407; 60/602
[58] Field of Search ...................... 60/39.08, 602, 605; 184/6.11; 417/406, 407

[56] References Cited

U.S. PATENT DOCUMENTS

| | | | |
|---|---|---|---|
| 1,310,682 | 7/1919 | Sherbondy | 60/602 |
| 3,089,304 | 5/1963 | Bozzola | 60/602 X |
| 3,104,520 | 9/1963 | Cazier et al. | 60/602 |

*Primary Examiner*—Michael Koczo

*Attorney, Agent, or Firm*—Robert J. Outland

[57] ABSTRACT

An engine turbocharger includes a bearing housing, which supports a rotor shaft carrying turbine and compressor impellers on opposite ends of the shaft, and enclosed by turbine and compressor housing members secured to the bearing housing and defining therewith fluid inlet and outlet passages for the turbine and compressor. The turbocharger is provided with an integral wastegate including (1) a poppet valve supported by the turbine housing and controlling bypass passages in the housing between the turbine inlet and outlet passages and (2) an actuating piston in the compressor housing exposed through internal passage means to gas pressure in the compressor outlet and engagable with the poppet valve stem so as to urge the valve in an opening direction as a function of compressor outlet pressure. The shaft bearing lubrication and cooling passages are arranged to also lubricate the wastegate valve stem and spring.

4 Claims, 4 Drawing Figures

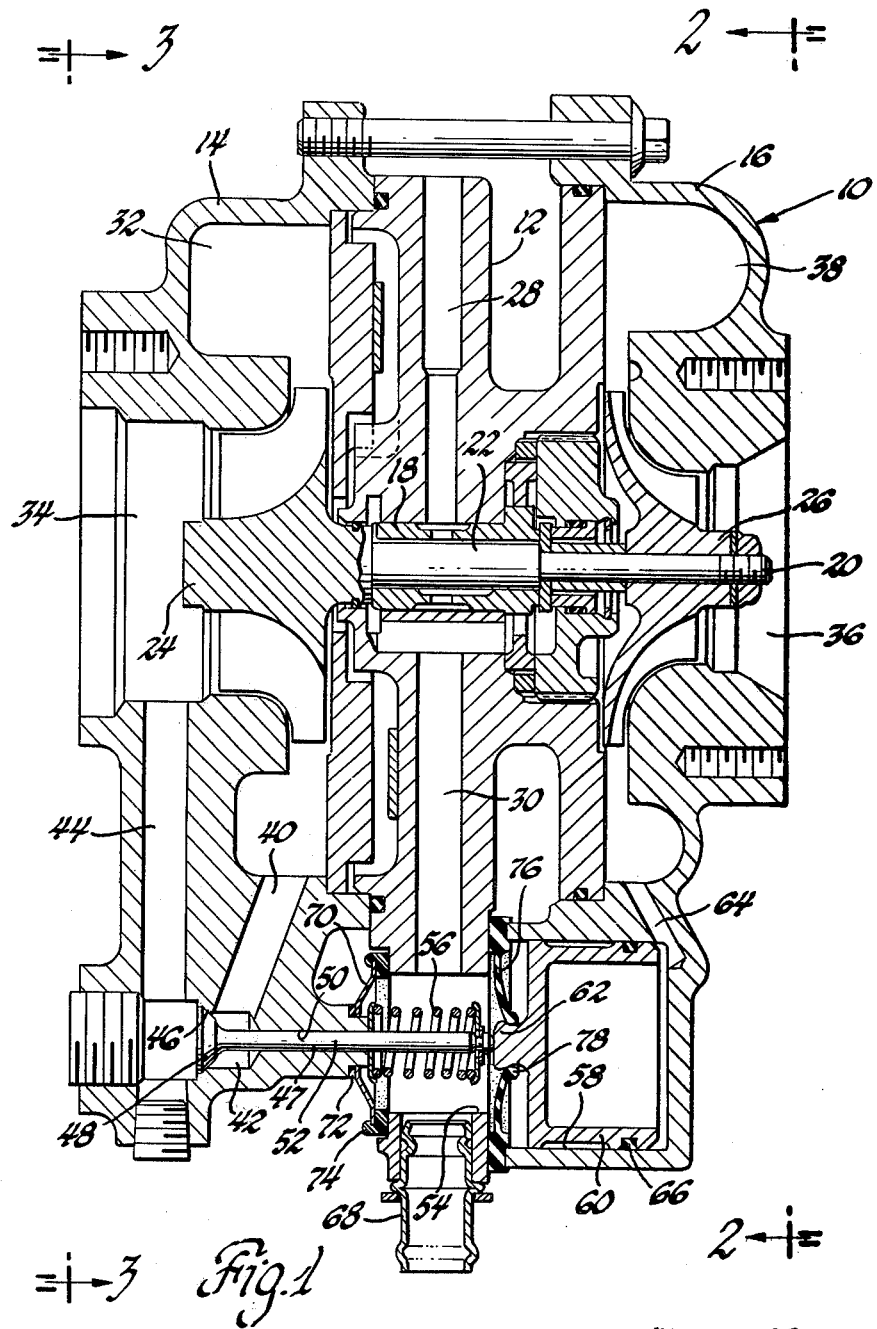
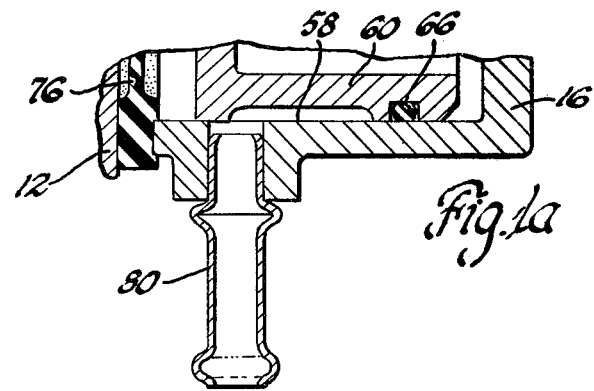

ized bore 50 of the turbine housing and closes

ENGINE TURBOCHARGER WITH INTEGRAL WASTEGATE

BACKGROUND OF THE INVENTION

It is known in the art relating to internal combustion engine turbochargers to provide exhaust wastegate devices responsive to various control signals, such as compressor outlet pressure, to bypass some portion of the exhaust gas flow around the turbine and thus provide a means of controlling the boost pressure developed by the compressor. There are many known arrangements and applications of wastegate valves, both separately from and integrated with some portion of the turbocharger assembly. All add some degree of cost and manufacturing complexity to the turbocharger and/or its ultimate installation.

SUMMARY OF THE INVENTION

The present invention provides an improved engine turbocharger arrangement having integrated therewith a wastegate device applied in a manner which reduces manufacturing costs while promoting reliable operation of the ultimate assembly. A feature of the invention is that the wastegate valve seat and bypass passages are integrally formed in the turbocharger turbine housing which also supports the wastegate valve. A further feature of the invention is that the actuating means provided to open the wastegate valve are mounted in the turbocharger compressor housing and connected with the compressor outlet passage by internal passage means. Still another feature of the invention is that the wastegate valve and its biasing spring extend into the outlet passage of the rotor shaft oil distribution system, thus providing for cooling and lubrication of the spring and valve stem. These and other features of the invention will be more fully understood from the following description of a specific embodiment taken together with the accompanying drawings.

BRIEF DESCRIPTION OF THE DRAWINGS

In the drawings:

FIG. 1 is a cross-sectional view of a turbocharger assembly with integral wastegate formed in accordance with the invention, taken generally in the plane indicated by the line 1—1 of FIG. 2;

FIG. 1a is a fragmentary cross-sectional view of a portion of the turbocharger taken generally in the plane indicated by the line 1a—1a of FIG. 2;

DESCRIPTION OF THE ILLUSTRATED EMBODIMENT

Figure 2:
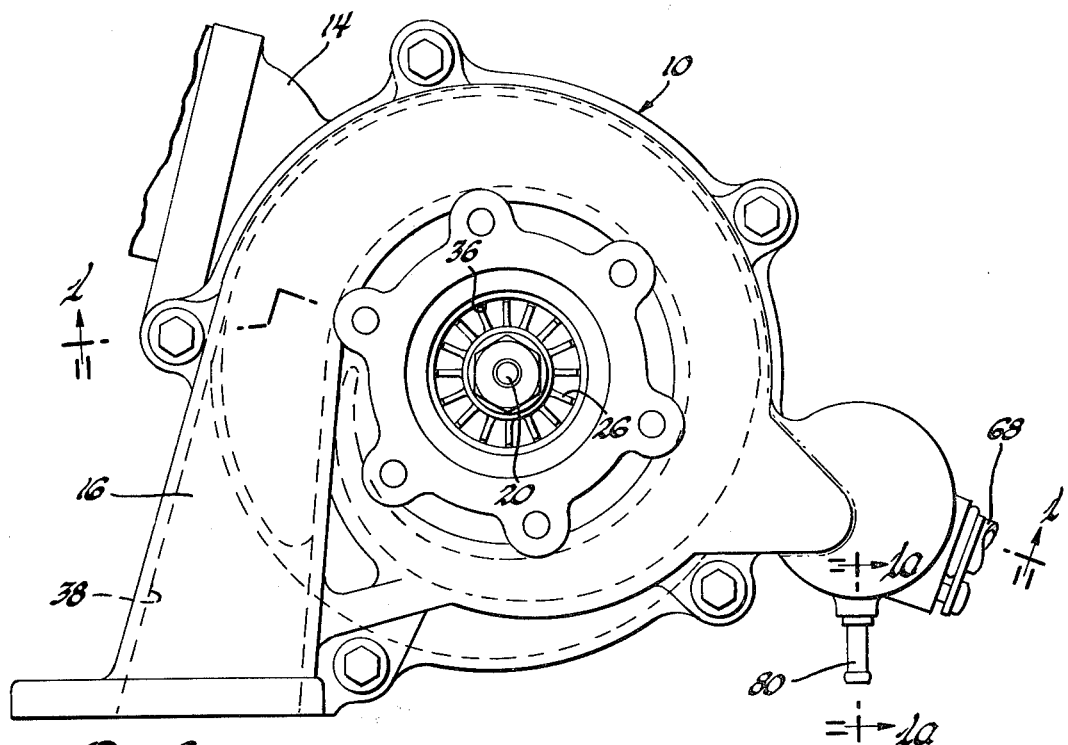
FIG. 2 is an elevational view of the compressor end of the turbocharger viewed from the plane indicated by the line 2—2 of FIG. 1.
Figure 3:
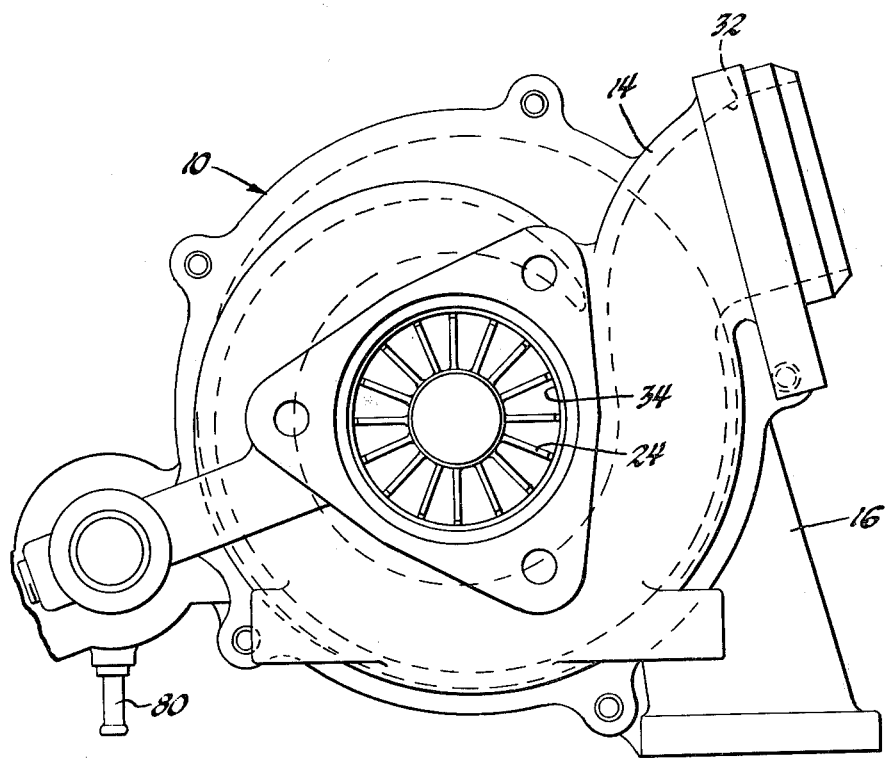
FIG. 3 is an elevational view of the turbine end of the turbocharger viewed from the plane indicated by the line 3—3 of FIG. 1.

In the drawings, numeral 10 generally indicates an exhaust turbine driven supercharger or turbocharger adapted for use with an internal combustion engine. Turbocharger 10 includes a central bearing housing 12 sandwiched between a turbine housing 14 and a compressor housing 16. The bearing housing 12 mounts a shaft bearing 18 in which is rotatably carried rotor 20 including a shaft 22 having formed at one end a turbine impeller 24 and detachably carrying on the other end a compressor impeller 26. The impellers 24, 26 are disposed on opposite sides of the bearing housing and respectively within the turbine housing and compressor housing. Drilled lubricant inlet and outlet passages 28, 30 are provided in the bearing housing for conducting lubricant to and carrying lubricant from the bearing 18 and shaft 22 for lubricating the rotor.

The turbine housing 14 includes inlet and outlet passages 32, 34 for conducting exhaust gases respectively to and from the turbine impeller. In similar fashion, the compressor housing 16 includes inlet and outlet passages 36, 38 for conducting air or air-fuel mixtures respectively to and from the compressor impeller 26.

The foregoing and other construction details, including seals, bearings, retention means, heat shield, securing devices and the like pertaining directly to the turbocharger rotor and its related components are of conventional construction and do not form a novel part of the present invention. Accordingly, further description of such details is believed unnecessary.

The disclosed embodiments includes a novel wastegate arrangement for bypassing exhaust gases around the turbine in response to the reaching of a predetermined compressor outlet pressure. The wastegate mechanism is integrated within the housing members of the turbocharger.

The turbine housing 14 includes drilled passages 40, 42, 44 which connect the turbine inlet passage 32 with the turbine outlet passage 34. The outer ends of passages 42 and 44 are plugged and a valve seat 46 is provided in passage 42. A poppet valve 47 is reciprocably disposed within the turbine housing having a head 48 which is engagable with the valve seat 46 to close the bypass formed by passage 40, 42, 44 around the turbine impeller 24. The valve 46 is reciprocably supported in a guide bore 50 of the turbine housing by its stem 52 which extends beyond the inner side of the turbine housing and into an axial opening 54 that extends through the bearing housing 12. A spring 56 operatively engaging the end of the valve stem and the turbine housing yieldably urges the valve head 48 toward the seat 46 to close the bypass passages.

Opposite the end of the valve stem, the compressor housing is provided with a cylindrical recess 58 in which there is disposed an actuating piston 60 axially reciprocable in the recess 58. Piston 60 has a central protrusion 62 with a flat end surface that is engagable with the end of the valve stem 52. A drilled passage 64 connects the bottom of the recess 58 with the compressor outlet passage 38 so as to conduct compressor outlet pressure to the inner side of the piston. An annular o-ring seal 66 contains the pressurized fluid behind the piston so as to urge the piston leftwardly, as shown in FIG. 1, against the stem of valve 47 in opposition to the bias of spring 56.

It will be noted that the axial opening 54 through the bearing housing 12 extends through the lubricant outlet passage 30 that conducts lubricant away from the rotor bearing 18. Beyond opening 54 the continuation of passage 30 receives a drain fitting 68 to which a suitable conduct or tube is connectable to return drained lubricant to the crankcase of an associated engine, not shown. The arrangement wherein the lubricant drain passage 30 intersects opening 54 provides means by which the rotor bearing lubricant is utilized further to lubricate and cool the valve stem 52, its guide bore 50 and the associated spring 56 before the lubricant is returned to the engine sump. A cover 70 engages seal members 72, 74 on the turbine and bearing housings, respectively, to provide a seal assembly that prevents the leakage of lubricant out through the turbine housing end of the axial opening 54. Seal 74 is preferably made of a resilient heat resistant material, such as Viton, of substantial thickness so as to limit the conduction of heat from the relatively hot turbine housing to the cooler bearing housing.

On the other side of the bearing housing, a diaphragm seal member 76 is secured between the compressor housing and the bearing housing and includes an inner lip 78 that engages the protrusion 62 in a manner to prevent the leakage of oil from the opening 54 into the cylindrical recess 58. The diaphragm seal also has the function of preventing the escape into the oil passages of any air-fuel mixture which may leak past the piston seal 66 and into the open side of the recess 58. Such mixture is directed instead to an outlet fitting 80 which is connectable with a tube for redirecting the mixture back to the engine induction system at a suitable point upstream of the turbocharger compressor.

In operation, engine exhaust gases entering the turbine inlet passage 32 normally pass through the turbine impeller 24 to the outlet 34, causing rotation of the turbine and compressor impellers 24, 26. The compressor impeller draws air or air-fuel mixture into the inlet 36 and compresses it, forcing it out through the outlet passage 38. The compressor outlet pressure is conducted through passage 64 to the back of the piston 60. When the compressor outlet pressure reaches a predetermined level, the force exerted by the pressure on the piston becomes sufficient to urge valve 47 in an opening direction against the bias of spring 56. This moves valve head 48 off the seat 46 and permits the bypassing or wastegating of some of the exhaust gases from the turbine inlet passage 32 to the outlet passage 34 through passages 40, 42, 44, thus bypassing the turbine and limiting the energy applied to driving the turbine by the exhaust gases. When the compressor outlet pressure again drops below the preset level, spring 56 is enabled to again close the valve, urging piston 60 rightwardly and shutting off the bypass of exhaust gases around the turbine.

From the foregoing description, it is seen that the arrangement of the components as described provides a turbocharger assembly with an integral wastegate formed with easily machined components, passages and recesses suitable for economy of manufacture. The use of an engine type poppet valve as a wastegate valve and the mounting of the valve and piston in separate components with engagement not requiring precise alignment also aids manufacturing economy. A further advantage of dual use of the lubricant passages for supplying lubricant both to the rotor and wastegate valve is also apparent. While the invention has been described by reference to a specific embodiment chosen for purposes of illustration, it should be understood that numerous changes could be made within the scope of the inventive concepts described. Accordingly, it is intended that the invention not be limited, except by the language of the following claims.

What is claimed is:

1. An engine turbocharger comprising a bearing housing having bearing means rotatably supporting a rotor shaft that carries a turbine impeller on one side of the housing and a compressor impeller on the other side of the housing, said housing having oil passages connecting with said bearing means to provide lubrication, a turbine housing secured to said one side of the bearing housing and enclosing the turbine impeller to define fluid inlet and outlet passages connected therewith, a compressor housing secured to said other side of the bearing housing and enclosing the compressor impeller to define fluid inlet and outlet passages connected therewith, said turbine housing having bypass means interconnecting its respective fluid inlet and outlet passages and including a valve seat, a poppet valve having a stem reciprocably carried by said turbine housing and a head on one end of the stem seatable on said valve seat to block flow around the turbine through said bypass means, said stem extending beyond said turbine housing into said bearing housing and in communication with said oil passages to lubricate the stem, spring means operatively engaging said valve and biasing said valve head toward said valve seat, fluid pressure responsive actuating means in said compressor housing and engageable with said valve stem to open said valve, and internal passage means communicating said actuating means with the outlet passage of said compressor housing whereby compressor outlet pressure acts on said actuating means to urge said valve in an opening direction opposite to the bias of said spring to thereby control the bypass of fluid around said turbine as a function of compressor outlet pressure.

2. An engine turbocharger comprising a bearing housing having bearing means rotatably supporting a rotor shaft that carries a turbine impeller on one side of the housing and a compressor impeller on the other side of the housing, said housing having oil passages connecting with said bearing means to provide lubrication, a turbine housing secured to said one side of the bearing housing and enclosing the turbine impeller to define fluid inlet and outlet passages connected therewith, a compressor housing secured to said other side of the bearing housing and enclosing the compressor impeller to define fluid inlet and outlet passages connected therewith, said turbine housing having bypass means interconnecting its respective fluid inlet and outlet passages and including a valve seat, a poppet valve having a stem reciprocably carried by said turbine housing and a head on one end of the stem seatable on said valve seat to block flow around the turbine through said bypass means, said stem extending beyond said turbine housing into an opening through said bearing housing and in communication with said oil passages to lubricate the stem, a coil spring operatively engaging said turbine housing and said valve and biasing said valve head toward said valve seat, said spring being carried on said stem in communication with said oil passages for lubrication and cooling, first and second oil seal means disposed respectively between said bearing and turbine housings and between said bearing and compressor housings and extending around said bearing housing opening to prevent the escape of lubricating oil from said oil passages through said opening, fluid pressure responsive actuating means in said compressor housing and engageable with said valve stem to open said valve, and internal passage means communicating said actuating means with the outlet passage of said compressor housing whereby compressor outlet pressure acts on said actuating means to urge said valve in an opening direction opposite to the bias of said spring to thereby control the bypass of fluid around said turbine as a function of compressor outlet pressure.

3. An engine turbocharger as defined in claim 2 wherein said actuating means comprises a piston reciprocably received in a cylindrical recess in said compressor housing and opening toward said bearing housing opening, said piston having a central protruding portion engageable with said valve stem.

4. An engine turbocharger as defined in claim 3 wherein said piston carries seal means engaging said cylindrical recess to limit the leakage of compressor outlet gases toward the open end of said recess, said second oil seal means between the bearing and compressor housings having a resilient inner lip engaging said piston protrusion to prevent the mixture of mixing of oil in said bearing housing opening with compressor outlet gases in said compressor housing recess, and outlet means from said compressor housing recess between said piston seal means and said second oil seal means to carry away compressor outlet gases passing said piston seal.

* * * * *